Patented Oct. 26, 1937

2,097,109

UNITED STATES PATENT OFFICE 2,097,109

PROCESS FOR THE MANUFACTURE OF SYNTHETIC RESINS

Theodor Sutter, Basel, Switzerland, assignor to Society of Chemical Industry in Basle, Basel, Switzerland No Drawing. Application September 23, 1935, Serial No. 41,825. In Switzerland, October 5, 1934

6 Claims. (Cl. 260—3)

This invention consists in the manufacture of resins capable of being molded and hardened by treating, with an acid condensing agent, a condensation product of a primary aromatic amine and an excess of formaldehyde having the probable formula

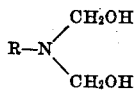

and obtainable by condensation, with elimination of water, from one molecular proportion of aromatic amine with more than two molecular proportions of formaldehyde in absence of an acid or in presence of a base, i. e. under neutral to alkaline reaction conditions, and at a temperature not appreciably higher than 40° C. as set forth in Patent No. 2,088,143, Serial No. 24,776, filed June 3, 1935. The resins may be obtained in soluble form, but prolonged heating in solution or alone converts them into insoluble, infusible synthetic resinous products.

The properties of the final product can be varied or improved if there is present during the condensation a substance having a tendency in itself to react with formaldehyde or with active methylene groups, for instance an aromatic amine, a phenol and an acid amide, particularly carbamide, thiocarbamide and aryl-sulfonic acid amides.

Suitable condensing agents are mineral acids, for instance hydrochloric acid, sulfuric acid or phosphoric acid; also organic acids, for instance acetic acid, salicylic acid, phthalic acid, fumaric acid, maleic acid, acrylic acid or citric acid, and compounds of acid reaction, such as $SnCl_4$, $ZnCl_2$, $PCl_3$, boron halides and the like.

In general it is advantageous to conduct the condensation in an organic solvent to better control the reaction. It is best to use a solvent which will retain in solution the condensation product formed, so that the mixture, after distillation of the water produced by the reaction and/or of an excess of the solvent, may be used, if desired, directly as a varnish or impregnating agent. As such solvents, I have found mixtures of benzene-hydrocarbons with alcohols, chlorinated hydrocarbons, acetone and the like suitable for the purpose.

It is a very considerable technical advance attained by the invention that the molecule of the condensation products serving as parent materials and obtainable from primary aromatic amines and formaldehyde already contains in an anhydrous form the formaldehyde necessary for forming the soluble hardening resins and this is the case even when the original condensation products are made from commercial aqueous formaldehyde solutions so that in the subsequent re-arrangement and condensation only the water eliminated during the reaction is involved. If the condensation occurs in solution in a mixture of benzene and alcohol the small proportion of water formed is not able to precipitate the resin from the solution, whereas in the known processes for making hardening amine resins the water furnished by the formaldehyde solution precipitates the resin from the alcohol or benzene-alcohol solution, so that the recovery of the solvent gives considerable difficulty. If in the known processes it is sought to avoid this difficulty by using para-formaldehyde or gaseous formaldehyde, the process is considerably complicated and of enhanced cost.

The parent material is advantageously made by the reaction of a primary aromatic amine with an excess of formaldehyde, viz. 3 to 5 molecular proportions, in presence of an equal weight of benzene. The benzene layer contains a condensation product of the amine and 2 mols formaldehyde in practically anhydrous form which, on addition of a suitable acid, preferably dissolved in alcohol, is condensed without appreciable loss of formaldehyde to a soluble hardening resin. The water produced by the reaction may be easily and completely separated by distillation of a portion of the organic solvent and there remains a solution of the resin ready for application as a coating, without the necessity of recovering an excess of formaldehyde or large quantities of solvent. The condensation product produced in this manner is obtained in quantitative yield and of uniform properties.

The great advantage of this mode of operation is that the formaldehyde used in excess in the manufacture of the parent material is recovered after separation of the benzene layer in a form directly applicable; the benzene may be used after addition of a little alcohol, if desired, as a solvent for the resinous product produced which, it may be added, is obtained in quantitative yield.

In contrast herewith the known processes which have for their object a condensation of aniline with excess of formaldehyde in presence of acid and of an organic solvent, yield seldom more than 60 per cent. of the resin expected from theoretical considerations and the mother liquor contains much excess of formaldehyde, a part of the acid used, considerable proportions of resinous impurities and a large proportion of dilute alcohol. The recovery of the latter is very difficult.

A further advantage of the invention is that the formaldehyde necessary for the formation of the hardening resin is united with the amine from the beginning of the condensation, which is the best condition for a uniform course of the reaction- and the conversion leads to homogeneous resins, whereas in the known processes, where a separation of the condensation product from the mixture occurs in the course of the reaction, it is impossible to avoid premature withdrawal of a part of the amine from further reaction with the formaldehyde and the acid.

By condensing together with the parent material different proportions of substances suitable for condensation with formaldehyde, for instance aniline, phenol, urea, toluene-sulfamide or the like, it is possible to vary in high degree the properties of the product; considerable admixtures of these substances diminish the hardening properties of the final product until, finally, when the addition has become large, the resins produced are no longer thermosetting, but by an addition of further aldehyde can be hardened. If the additional aldehyde is added before or during the condensation, soluble hardening resins may also be obtained; if desired the aldehyde addition may be delayed until after the condensation is complete, e. g. during the mixing of the product with the filling materials. By the addition of about 0.1 to 0.3 mol. of aniline or phenol there are generally obtained good hardening resins without the necessity of adding further aldehyde.

By prolonged heating of the condensation solution the viscosity is generally increased and may proceed even to the gelatinization of the whole solution. It is therefore possible to adjust the degree of viscosity to that most favorable for the purpose in view.

If a solution of the product is evaporated to dryness in a vacuum and the residue subjected to a suitable preliminary hardening, the resin may be pressed to form clear molded bodies. If the solutions are used for coating or impregnating paper web, it is possible in the usual manner to make laminated or rolled molded bodies of excellent electrical and mechanical properties; in admixture with woodmeal molded masses may be obtained whose flux depends on the degree of prehardening; they are well suited for making complicated shapes. The preliminary hardening is performed at a moderate temperature, viz. 50 to 110° C. for several hours, or by a shorter treatment at temperatures up to 150° C.

The following examples illustrate the invention, the parts being by weight unless otherwise stated and the parts by volume bearing the same ratio to the parts by weight as that of the liter to the kilo:—

Example 1

1200 parts by volume of formaldehyde of 39 per cent. by volume strength are mixed with 500 parts by volume of benzene and 50 parts of a sodium carbonate solution of 10 per cent. strength; into this mixture there is dropped, while stirring vigorously, 372 parts of aniline in 500 parts by volume of benzene and stirring is continued for 4 hours. The whole is allowed to settle and the layers separated. The aqueous layer is a practically pure formaldehyde solution of about 20 per cent. strength which, if desired, may be used for making a further batch after it has been enriched with formaldehyde. The nearly colorless benzene layer is shaken with water in order to separate excess of formaldehyde; it is then dried and mixed in a reflux apparatus with a solution of 25 parts by volume of concentrated hydrochloric acid in 500 parts of alcohol, and the mixture is heated gradually in the water-bath. The solution becomes yellow, then orange and finally dark red. Boiling is continued for 2 hours in the reflux apparatus and a part of the solvent is distilled under diminished pressure until no water passes over. There is obtained a freely mobile solution of resin which, without further treatment, may be used for impregnating filling materials or for varnishing fibrous webs. By evaporating the solution in a vacuum there is obtained a bright resin which softens at 80° C. and becomes infusible and insoluble on prolonged heating and may be pressed alone or in admixture with filling agents to produce valuable shaped bodies.

Example 2

A benzene solution, obtained analogously to that described in Example 1 from 4 mols aniline and about 16 mols formaldehyde and containing a similar condensation product, is mixed withwashing with 1.5 mols phenol and ¼ mol. phthalic acid, dissolved in 10 times their weight of alcohol; this mixture is boiled under reflux for 6 hours; there is produced a red solution of resin in benzene and alcohol, which directly or after distillation of the water, together with part of the solvent, may be used for impregnating purposes. The solution also yields on various supports rapidly drying adherent lacquer coatings which become insoluble and infusible by heat-treatment. A molding powder containing about 50 per cent. of woodmeal and made in the usual manner from this resin has good fluidity and may be molded to valuable forms of remarkable strength.

Example 3

As described in Example 1, 465 parts of aniline are condensed with 1200 parts by volume of formaldehyde of 39 per cent. by volume strength which has been made feebly alkaline with sodium carbonate in presence of 1000 parts by volume of benzene. The separated benzene layer is dried over potassium carbonate and dissolved together with 100 parts of phthalic acid in 1000 parts by volume of a mixture of alcohol and benzene and to the whole 60 parts of aniline are added. When the mass is heated in the water-bath the color soon passes to yellow-red; preferably, the boiling is interrupted after 1 hour, whereby there is obtained a solution, which is still thinly liquid, of the new resin in a mixture of alcohol and benzene. By prolonged boiling this solution is continuously thickened until gelatinization begins after 3–4 hours. After the desired degree of viscosity has been attained the solution may be used for lacquering or impregnating.

Example 4

65 parts of aniline are dissolved in 40 parts by volume of benzene; while stirring well there is dropped into the solution a mixture of 212 parts by volume of formaldehyde of 40 per cent. strength, 1 part of anhydrous sodium carbonate and 80 parts by volume of benzene. After stirring for 3 hours the benzene layer is separated in a separating funnel from the aqueous layer and is distilled under diminished pressure to remove the greater part of the benzene. The syrupy residue is thoroughly kneaded in a mixing device with 100 parts of woodmeal and during the kneading a solution of 10 parts of phthalic acid in 50 parts by vol. of alcohol and then 5 parts of aniline are introduced. After kneading for 1-2 hours the mixture is dried, preferably under diminished pressure, and there is thus obtained a quickly hardening molding powder which flows well and yields molded pieces of very good mechanical and electrical properties.

*Example 5*

A concentrated benzene solution, made as described in Example 4, of the aniline-formaldehyde compound, is mixed with 100 parts of woodmeal with gradual addition of an alcoholic solution of 13 parts of phthalic acid and there are added 3 parts of para-formaldehyde and 10 parts of aniline during the kneading. After thorough incorporation the mass is dried at as low a temperature as possible. The molded pieces made from this mixture have a strong resistance to heat.

What I claim is:—

1. In the manufacture of a moldable thermosetting synthetic resin from a primary aromatic amine and formaldehyde, the step of resinifying a condensation product, obtained under neutral to alkaline conditions and at a temperature not appreciably above 40° C. by reacting a primary aromatic amine with more than 2 molecular proportions of formaldehyde and having combined 2 molecules of formaldehyde to the amino group of the aromatic amine, consisting in reacting the said condensation product in the presence of an organic solvent with an acid condensing agent until resinification occurs.

2. In the manufacture of a moldable thermosetting synthetic resin from a primary aromatic amine and formaldehyde, the step of resinifying a condensation product, obtained under neutral to alkaline conditions and at a temperature not appreciably above 40° C. by reacting a primary aromatic amine with more than 2 molecular proportions of formaldehyde and having combined 2 molecules of formaldehyde to the amino group of the aromatic amine, consisting in reacting the said condensation product in the presence of an organic solvent, which is also a solvent for the condensation product formed, with an acid condensing agent until resinification occurs.

3. In the manufacture of a moldable thermosetting synthetic resin from a primary aromatic amine and formaldehyde, the step of resinifying a condensation product, obtained under neutral to alkaline conditions and at a temperature not appreciably above 40° C. by reacting a primary aromatic amine with more than 2 molecular proportions of formaldehyde and having combined 2 molecules of formaldehyde to the amino group of the aromatic amine, consisting in reacting the said condensation product in the presence of an organic solvent of the group consisting of mixtures of benzene hydrocarbons with alcohols, chlorinated hydrocarbons, and acetone, with an acid condensing agent until resinification occurs.

4. In the manufacture of a moldable thermosetting synthetic resin from a primary aromatic amine and formaldehyde, the step of resinifying a condensation product, obtained under neutral to alkaline conditions and at a temperature not appreciably above 40° C. by reacting a primary aromatic amine with more than 2 molecular proportions of formaldehyde and having combined 2 molecules of formaldehyde to the amino group of the aromatic amine, consisting in reacting the said condensation product in the presence of an organic solvent with an acid condensing agent in presence of an aldehyde binding agent selected from the group consisting of phenols, aromatic amines and acid amides, until resinification occurs.

5. As a composition of matter, a moldable thermosetting synthetic resin, soluble in mixtures of benzene hydrocarbons and alcohols, obtained by resinifying a condensation product, obtained under neutral to alkaline conditions and at a temperature not appreciably above 40° C. by reacting a primary aromatic amine with more than 2 molecular proportions of formaldehyde and having combined 2 molecules of formaldehyde to the amino group of the aromatic amine, by reacting the said condensation product in the presence of an organic solvent with an acid condensing agent until resinification occurs.

6. As a composition of matter, a moldable thermosetting synthetic resin, soluble in mixtures of benzene hydrocarbons and alcohols, obtained by resinifying a condensation product, obtained under neutral to alkaline conditions and at a temperature not appreciably above 40° C. by reacting a primary aromatic amine with more than 2 molecular proportions of formaldehyde and having combined 2 molecules of formaldehyde to the amino group of the aromatic amine, by reacting the said condensation product in the presence of an organic solvent with an acid condensing agent in presence of an aldehyde binding agent selected from the group consisting of phenols, aromatic amines and acid amides, until resinification occurs.

THEODOR SUTTER.